United States Patent
Regnier

(10) Patent No.: US 7,533,299 B2
(45) Date of Patent: May 12, 2009

(54) TEMPORAL CORRELATION OF MESSAGES TRANSMITTED BY A MICROPROCESSOR MONITORING CIRCUIT

(75) Inventor: Laurent Regnier, Gieres (FR)

(73) Assignee: STMicroelectronics S.A., Montrouge (FR)

( * ) Notice: Subject to any disclaimer, the term of this patent is extended or adjusted under 35 U.S.C. 154(b) by 352 days.

(21) Appl. No.: 10/531,509

(22) PCT Filed: Oct. 29, 2002

(86) PCT No.: PCT/FR02/03725

§ 371 (c)(1),
(2), (4) Date: Apr. 14, 2005

(87) PCT Pub. No.: WO2004/042580

PCT Pub. Date: May 21, 2004

(65) Prior Publication Data

US 2006/0015297 A1    Jan. 19, 2006

(51) Int. Cl.
*G06F 19/00* (2006.01)
*G06F 11/00* (2006.01)
*G06F 9/00* (2006.01)

(52) U.S. Cl. ............. 714/25; 714/37; 712/227; 702/108; 702/117; 702/120

(58) Field of Classification Search ......... 713/500, 713/501, 502, 600; 714/37, 25; 712/227; 702/108, 117, 118, 119, 120
See application file for complete search history.

(56) References Cited

U.S. PATENT DOCUMENTS

| | | | | |
|---|---|---|---|---|
| 4,200,928 A | * | 4/1980 | Allan et al. | 711/114 |
| 5,237,684 A | * | 8/1993 | Record et al. | 719/318 |
| 5,267,246 A | * | 11/1993 | Huang et al. | 714/45 |
| 5,621,663 A | | 4/1997 | Skagerling | |
| 5,996,092 A | | 11/1999 | Augsburg et al. | |
| 6,167,536 A | * | 12/2000 | Mann | 714/45 |
| 6,332,117 B1 | | 12/2001 | Berry et al. | |
| 6,467,083 B1 | | 10/2002 | Yamashita | |

(Continued)

FOREIGN PATENT DOCUMENTS

EP    1 184 790 A2    3/2002

OTHER PUBLICATIONS

International Search report from corresponding Intn'l Application No. PCT/FR02/03725, filed Oct. 29, 2002.

(Continued)

*Primary Examiner*—Mark Connolly
(74) *Attorney, Agent, or Firm*—Lisa K. Jorgensort; James H. Morris; Wolf, Greenfield & Sacks, P.C.

(57) ABSTRACT

The invention concerns a method for transmitting digital messages through output terminals (22) of a monitoring circuit (18) integrated to a microprocessor (12), said messages representing specific events occurring upon the execution of instructions by the microprocessor comprising the step which consists, after or before transmitting at least one specific message associated with a particular event in transmitting a correlation message including an identifier of said specific message and a counter for the number of instructions executed by the microprocessor between the instruction associated with the transmission of said specific message and the instruction associated with a selected previous message. The invention also concerns a device for transmitting digital messages.

29 Claims, 1 Drawing Sheet

| TCODE | SRC | EVENT | ICNT |
|---|---|---|---|

U.S. PATENT DOCUMENTS

| | | |
|---|---|---|
| 6,519,766 B1 | 2/2003 | Barritz et al. |
| 6,557,147 B1 * | 4/2003 | Lee et al. ................ 716/4 |
| 6,792,456 B1 * | 9/2004 | Hellerstein et al. .......... 709/224 |

OTHER PUBLICATIONS

International Search report from related Intn'l Application No. PCT/FR02/03723, filed Oct. 29, 2002.

International Search report from related Intn'l Application No. PCT/FR02/03526, filed Oct. 15, 2002.

International Search report from related Intn'l Application No. PCT/FR02/03521, filed Oct. 15, 2002.

International Search report from related Intn'l Application No. PCT/FR02/03724, filed Oct. 29, 2002.

Plauger, D., *Real-Time Unix: Timing is Everything*, Mini Micro Systems, Cahners Publishing CY, Boston, vol. 22, No. 2, Feb. 1, 1989, pp. 72-76, XP000039292.

Okeeffe, H. et al., *Einheitliche Debug-Schnittstelle Der Zukunft Der Nexus-Standard Soll Die Kommunikation Zwischen Emulator Und Prozessor Vereinheitlichen*, Elektronik, Franzis Verlag GMBH, Munchen, vol. 49, No. 18, Sep. 5, 2000, pp. 124-128, XP001107530.

Macnamee, C., *Ein Interface Fuer Alle Nexus Als Globaler Debug-Standard*, Elektronikpraxis, Vogel, Wuerzburg, No. 3, Feb. 8, 2000, pp. 104-108, XP008001346.

Schmitt, W., *Nexus—Debug Konzept Der Zukunft? Universelle Emulations-Und Kalibrierschnittstelle Fuer Mikrocontroller*, Elektronik, Franzis Verlag GMBH, Munchen, vol. 48, No. 17, Aug. 24, 1999, pp. 52-59, XP000931028.

Nexis 5001 Forum: *Stardard for a Global Embeded Processor Debug Interface*, Dec. 15, 1999, IEEE-ISTO XP002247195.

* cited by examiner

TEMPORAL CORRELATION OF MESSAGES TRANSMITTED BY A MICROPROCESSOR MONITORING CIRCUIT

BACKGROUND OF THE INVENTION

1. Field of the Invention

The present invention relates to the testing of microprocessors. It more specifically relates to a method and device of digital data transmission between a monitoring circuit integrated in a microprocessor chip and an analysis tool.

2. Discussion of the Related Art

FIG. 1 schematically shows an integrated circuit 10 comprising a microprocessor (μP) 12, an internal memory (MEM) 14, and input/output terminals (I/O) 16. Microprocessor 12 is intended to execute a program or a software stored in memory 14. Under control of the program, microprocessor 12 may process data provided by input/output terminals 16 or stored in memory 14 and read or write data through input/output terminals 16.

To check the proper operation of the microprocessor, a monitoring circuit 18 (TEST) is generally integrated with integrated circuit 10. Monitoring circuit 18 is capable of reading specific data provided by microprocessor 12 on execution of a program, and of possibly processing the read data. Test terminals 22 connect monitoring circuit 18 to an analysis tool 24. Analysis tool 24 may process the received signals, for example, according to commands provided by a user, and ensure a detailed analysis of the operation of microprocessor 12. In particular, analysis tool 24 may determine the program instruction sequence really executed by microprocessor 12.

The number of test terminals 22 may be on the same order of magnitude as the number of input/output terminals 16, for example, from 200 to 400 terminals. Test terminals 22 as well as the connections of monitoring circuit 18 take up a significant silicon surface area, which causes an unwanted increase in the circuit cost. For this purpose, a first version of integrated circuit 10 comprising monitoring circuit 18 and test terminals 22 is produced in small quantities to debug the program of microprocessor 12 or "user program". After this debugging, a version of integrated circuit 10 rid of monitoring circuit 18 and of test terminals 22 is sold. This requires the forming of two versions of the integrated circuit, which requires a significant amount of work and is relatively expensive. Further, the final chip is not necessarily identical to the tested chip.

To overcome the above-mentioned disadvantages, it is desired to form a monitoring circuit 18 which takes up a reduced surface area and only requires a reduced number of test terminals 22, which decreases the selfcost of the monitoring circuit. Monitoring circuit 18 can then be left on the finally sold integrated circuit 10.

It is thus desired to decrease the number of signals provided by monitoring circuit 18. For this purpose, certain logic operations are directly performed at the level of monitoring circuit 18 on the data measured at the level of microprocessor 12 to only transmit messages having an important information content.

Thus, standard IEEE-ISTO-5001 in preparation provides in its 1999 version a specific message exchange protocol between a monitoring circuit and an analysis tool for a monitoring circuit 18 requiring but a reduced number of test terminals 22.

Among the messages provided by monitoring circuit 18 according to standard IEEE-ISTO-5001, program tracing messages and data messages are distinguished. Program tracing messages provide information relative to the order of execution of the program by microprocessor 12. It may, for examples, be a message indicating that a jump has occurred in the program executed by microprocessor 12. Data messages correspond to the other messages provided by monitoring circuit 18 and especially provide information relative the data processed by the microprocessor. It may be a message representative of a data read or write operation in an area of memory 14.

Based on the program tracing messages transmitted by monitoring circuit 18, analysis tool 24 attempts to reconstitute the instruction sequence executed by microprocessor 12. The reconstituted instruction sequence can then be compared to an instruction sequence theoretically executed by microprocessor 12 to determine malfunctions of microprocessor 12.

When monitoring circuit 18 transmits to analysis tool 24 the program tracing and data messages altogether, analysis tool 24 generally can assign to each received message a specific instruction of the program by means of adapted algorithms. However, to avoid for the data transmission frequency of monitoring circuit 18 to exceed the passband imposed by the technologies used to form the intermediary elements between monitoring circuit 18 and test terminals 22, that is, to avoid saturation of monitoring circuit 18, only some of the messages provided by standard IEEE-ISTO-5001 are generally transmitted on a same program portion. For example, only the read operations concerning a specific area of memory 14 may be subject to the message transmission to analysis tool 24. In such an example, when analysis tool 24 successively receives several data messages between two program tracing messages, it may be difficult to have a specific program instruction correspond to each received data message if, between the two program instructions corresponding to the two program tracing messages, there exist a significant number of instructions from which the received data messages can originate. The establishing of correspondences is more difficult still, or even impossible in certain cases, for example when an indirect addressing mode is used. An example of use of an indirect addressing mode corresponds to an operation of reading or writing of data associated with a program instruction which does not explicitly comprise the address of a register of the memory into or from which the data must be written or read, but which comprises the address of a register in which is stored the address of the memory register into or from which the data must be written or read. In the case where several program instructions associated with a read or write operation are neighbors and refer to the same register, it can then be difficult, or even impossible, to establish the correspondence between the received messages and the corresponding instructions.

Standard IEEE-ISTO-5001 also provides periodic transmission of a specific program tracing message called the synchronization message comprising the complete address of the instruction just executed by microprocessor 12 at the time when the synchronization message has been generated by monitoring circuit 18. The synchronization messages enable analysis tool 24 to check that it is performing a correct correlation between the received messages and the program instructions executed by microprocessor 12, and if not, adjusting the correlation. A synchronization message is also punctually transmitted when monitoring circuit 18 starts the transmission of messages to analysis tool 24 or interrupts it.

A possibility to ease the correlation between messages received by analysis tool 24 and program instructions would consist of transmitting a synchronization message with each data message. However, the coding of the complete address which is contained in a synchronization message requires a significant number of bits. The systematic use of synchronization messages would thus risk saturating monitoring circuit 18. Further, as already explained, synchronization messages have already been transmitted periodically or punctually to analysis tool 24 for other purposes. It would then be difficult for analysis tool 24 to make the difference between synchronization messages associated with data messages and synchronization messages periodically or punctually transmitted.

SUMMARY OF THE INVENTION

The present invention provides a device and a method for transmitting digital messages between a circuit for monitoring a microprocessor and an analysis tool enabling the analysis tool to perform a correct correlation between the received messages and instructions of the program executed by the micro-processor.

The present invention also enables not modifying the messages already provided by standard IEEE-ISTO-5001.

To achieve these and other objects, the present invention provides a method for transmitting digital messages through output terminals of a monitoring circuit integrated on a microprocessor, said messages being representative of determined events occurring on execution of instructions by the microprocessor, comprising the step of, after or before transmission of at least one specific message associated with a specific event, transmitting a correlation message comprising an identifier of said specific message and a counter of the number of instructions executed by the microprocessor between the instruction associated with the transmission of said specific message and the instruction associated with the transmission of a selected previous message.

According to an embodiment of the present invention, the selected previous message is the immediately preceding specific message.

According to an embodiment of the present invention, the correlation message comprises a correlation message identifier.

According to an embodiment of the present invention, the specific digital message is representative of a data read or write instruction.

According to an embodiment of the present invention, the specific digital message is representative of an event independent from the execution of an instruction by the microprocessor.

According to an embodiment of the present invention, the transmitted digital messages are received by an analysis tool capable of associating based on correlation messages an instruction executed by the microprocessor with each transmitted digital message.

The present invention also provides a device for transmitting digital messages through output terminals of a monitoring circuit integrated to a microprocessor, said digital messages being representative of determined events occurring on execution of instructions by the microprocessor, comprising a means for detecting whether a message to be transmitted by the monitoring circuit is of a specific type; and a means for transmitting, after or before transmission of a digital message of said specific type, a correlation message, said correlation message comprising an identifier of said specific digital message and a counter of the number of instructions executed by the microprocessor between the instruction associated with the transmission of the specific digital message and the instruction associated with the transmission of a selected previous digital message.

Brief Description of the Drawings

The foregoing and other objects, features, and advantages of the present invention will be discussed in detail in the following non-limiting description of specific embodiments in connection with the accompanying drawings, among which.

DETAILED DESCRIPTION

According to the present invention, monitoring circuit 18 transmits a correlation message before or after the transmission of each data message. The correlation message comprises a counter equal to the number of instructions executed by microprocessor 12 between the instruction causing the data message which has just been transmitted or which will be transmitted and the instruction causing the previous data message which has been transmitted. Based on the counters provided by the correlation messages, analysis tool 24 can perform in sure fashion a correlation between the data message which has just been received or will be received and a program instruction.

Figure 1:
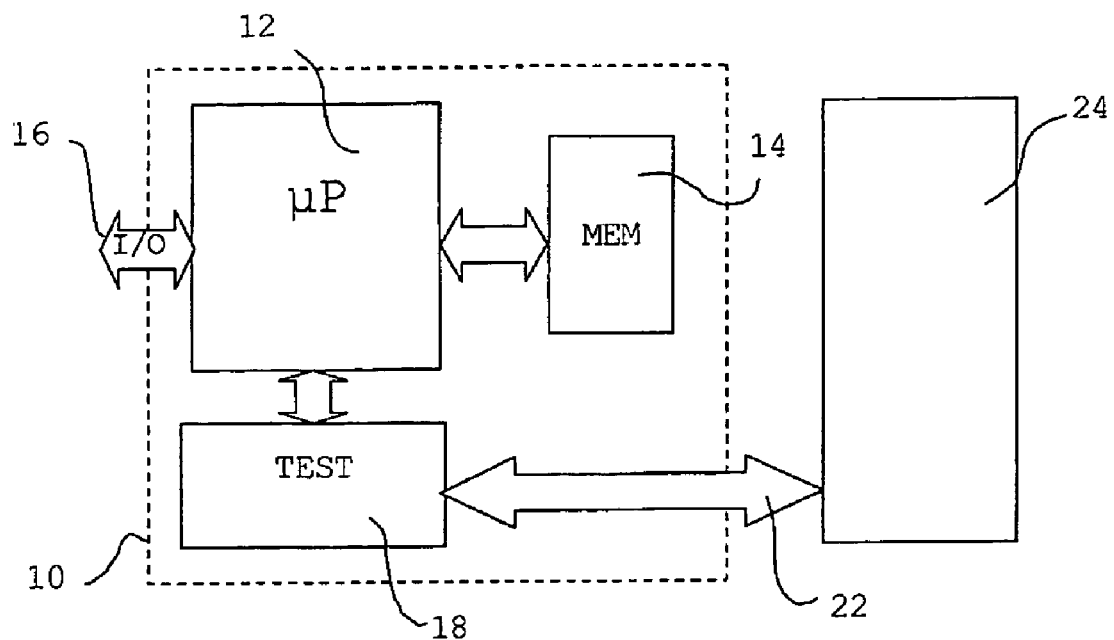
FIG. 1, previously described, very schematically shows the architecture of a conventional chip integrating a microprocessor and a monitoring device.
Figure 2:
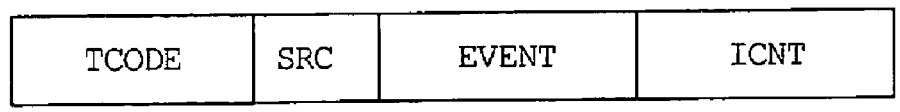
FIG. 2 shows an example of a message according to the present invention transmitted by the monitoring circuit to the analysis tool.

FIG. 2 shows an example of a digital correlation message according to the present invention.

The correlation message comprises a first field TCODE comprising a fixed number of bits and equal to a code identifying the correlation message.

A second field SRC of the correlation message comprises a variable number of bits and indicates whether monitoring circuit 18 simultaneously exchanges data with several microprocessors or whether monitoring circuit 18 exchanges data with the same microprocessor simultaneously executing several different programs. The second field contains no bit in the case where monitoring circuit 18 is connected to a single microprocessor 12 which executes a single program.

A third field EVENT of the correlation message comprises a variable number of bits and is equal to an identifier of the data message associated with the correlation message. According to the number of possible types of data messages that can be associated with a correlation message, the size of field EVENT is smaller or larger. The most frequent data messages for example correspond to a message representative of a read or write instruction, to a message indicating that certain operation conditions of the microprocessor are fulfilled or to a message indicating the occurrence of a specific event which does not necessarily depend on the operation of microprocessor 12. In the last example, the specific event, for example, corresponds to the reception by microprocessor 12 of a signal indicating that the charge level of the batteries supplying chip 10 is below a determined threshold. It may also be, for an application to mobile telephony, the transmission of a signal for controlling the blanking of a portable telephone screen. Further, standard IEEE-ISTO-5001 enables a user to provide personalized messages in addition to the messages explicitly provided by the standard. The personalized messages are then considered as data messages and the transmission of a personalized message is preceded or followed by the transmission of a correlation message.

A fourth field ICNT of the correlation message comprises a variable number of bits and indicates the number of instructions of the program executed by microprocessor 12 between the instruction causing the transmission of the data message associated with the correlation message and the instruction causing the transmission of the last data message.

The correlation messages are used by analysis tool 24 to have a program instruction executed by microprocessor 12 correspond to each data message. To achieve this result, analysis tool 24 also uses the program tracing messages for which the assignment of a program instruction will generally not be a problem. Thereby, when the user inhibits the function of sending of program tracing messages by monitoring circuit 18, no further correlation messages are transmitted.

The correlation message may be transmitted with any type of data message or with specific data message types. According to standard IEEE-ISTO-5001, each message transmitted by monitoring circuit 18 comprises a code identifying the message type. When monitoring circuit 18 generates a message, it detects the code identifying the generated message to associate or not a correlation message with the generated message.

The present invention has many advantages:

First, it enables ensuring an unambiguous correlation between each message received by the analysis tool and an instruction of the program executed by the microprocessor.

Second, it enables limiting the number of additional data to be transmitted by the monitoring circuit. Indeed, the correlation message provided by the present invention comprises an instruction counter having a reduced size and, in particular, smaller than that of a complete instruction address used by the synchronization message.

Third, it enables simplifying the algorithms used by the analysis tool to establish the correlation between the received messages and the program instructions.

Fourth, the present invention enables not modifying the messages already provided by standard IEEE-ISTO-5001 since it only provides adding a new correlation message.

Of course, the present invention is likely to have various alterations, modifications, and improvements which will readily occur to those skilled in the art. In particular, it may be provided for the monitoring circuit to directly receive certain signals through the chip input/output terminals. Such signals may be used for the detection by the monitoring circuit of events for which it is desired to indicate to the analysis tool that they have occurred.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for transmitting digital messages through output terminals of a monitoring circuit integrated wit a microprocessor, said messages being representative of determined events occurring on execution of instructions by the microprocessor, comprising:

after or before transmission of at least one specific digital message associated with a specific event, transmitting a correlation message comprising an identifier of said specific digital message and a counter of a number of instructions executed by the microprocessor between an instruction associated with the transmission of said specific message and an instruction associated with transmission of a selected previous digital message.

2. The method of claim 1, in which the selected previous digital message is a digital message immediately preceding the specific digital message.

3. The method of claim 1, in which the correlation message comprises a correlation message identifier.

4. The method of claim 1, in which the specific digital message is representative of a data read or write instruction.

5. The method of claim 1, in which the specific digital message is representative of an event independent from the execution of an instruction by the microprocessor.

6. A device for transmitting digital messages through output terminals of a monitoring circuit integrated with a microprocessor, said digital messages being representative of determined events occurring on execution of instructions by the microprocessor, comprising:

means for detecting whether a digital message to be transmitted by the monitoring circuit is of a specific type; and means for transmitting, after or before transmission of a digital message of said specific type, a correlation message, said correlation message comprising an identifier of said specific digital message and a counter of a number of instructions executed by the microprocessor between an instruction associated with the transmission of the specific digital message and an instruction associated with transmission of a selected previous digital message.

7. The device of claim 6, wherein the previous digital message immediately precedes the digital message.

8. The device of claim 6, wherein the correlation message further comprises a correlation message identifier.

9. The device of claim 6, wherein the digital message is representative of a data read or write instruction.

10. The device of claim 9, wherein the digital message is representative of an event independent from execution of instructions by the microprocessor.

11. The device of claim 6, wherein the transmitted digital messages are received by an analysis tool that associates, based on correlation messages, an instruction executed by the microprocessor with a transmitted digital message.

12. The device of claim 6 further comprising means for detecting a type of the digital message.

13. A system comprising:

a microprocessor, for transmitting digital messages representative of events occurring on execution of instructions by the microprocessor; and means for transmitting, after or before transmission of at least one digital message associated with an event, a correlation message comprising at least an identifier of the digital message and a counter comprising a number of instructions executed by the microprocessor between an instruction associated with the transmission of the digital message and an instruction associated with transmission of a previous digital message.

14. The system of claim 13, wherein the previous digital message immediately precedes the digital message.

15. The system of claim 13, wherein the correlation message further comprises a correlation message identifier.

16. The system of claim 13, wherein the digital message is representative of a data read or write instruction.

17. The system of claim 16, wherein the digital message is representative of an event independent from execution of instructions by the microprocessor.

18. The system of claim 13 further comprising means for detecting a type of the digital message.

19. A method for transmitting digital messages through output terminals of a monitoring circuit integrated with a microprocessor, said messages being representative of determined events occurring on execution of instructions by the microprocessor, comprising:

after or before transmission of at least one specific digital message associated with a specific event, transmitting a correlation message comprising an identifier of said specific digital message and a counter of a number of instructions executed by the microprocessor between an instruction associated with the transmission of said specific message and an instruction associated with transmission of a selected previous digital message, wherein the transmitted digital messages are received by an analysis tool that associates, based on correlation messages, an instruction executed by the microprocessor with each transmitted digital message.

20. The method of claim 19, in which the selected previous digital message is a digital message immediately preceding the specific digital message.

21. The method of claim 19, in which the correlation message comprises a correlation message identifier.

22. The method of claim 19, in which the specific digital message is representative of a data read or write instruction.

23. The method of claim 19, in which the specific digital message is representative of an event independent from the execution of an instruction by the microprocessor.

24. The system comprising:
   a microprocessor, for transmitting digital messages representative of events occurring on execution of instructions by the microprocessor; and
   means for transmitting, after or before transmission of at least one digital message associated with an event, a correlation message comprising at least an identifier of the digital message and a counter comprising a number of instructions executed by the microprocessor between an instruction associated with the transmission of the digital message and an instruction associated with transmission of a previous digital message, wherein the transmitted digital messages are received by an analysis tool that associates, based on correlation messages, an instruction executed by the microprocessor with a transmitted digital message.

25. The system of claim 24, wherein the previous digital message immediately precedes the digital message.

26. The system of claim 24, wherein the correlation message further comprises a correlation message identifier.

27. The system of claim 24, wherein the digital message is representative of a data read or write instruction.

28. The system of claim 27, wherein the digital message is representative of an event independent from execution of instructions by the microprocessor.

29. The system of claim 24 further comprising means for detecting a type of the digital message.

* * * * *

UNITED STATES PATENT AND TRADEMARK OFFICE
CERTIFICATE OF CORRECTION

PATENT NO. : 7,533,299 B2
APPLICATION NO. : 10/531509
DATED : May 12, 2009
INVENTOR(S) : Laurent Regnier It is certified that error appears in the above-identified patent and that said Letters Patent is hereby corrected as shown below:

Col. 2, lines 3, should read:
example, be a message indicating that a jump has occurred in Claim 1, col. 5, line 53, should read:
output terminals of a monitoring circuit integrated with a Signed and Sealed this Twenty-third Day of June, 2009

JOHN DOLL
*Acting Director of the United States Patent and Trademark Office*